US012616227B2

(12) United States Patent
Li et al.

(10) Patent No.: US 12,616,227 B2
(45) Date of Patent: May 5, 2026

(54) STABLE CAROTENOID MICROCAPSULE HAVING HIGH BIOAVAILABILITY AND PREPARATION METHOD THEREFOR

(71) Applicants: ZHEJIANG NHU COMPANY LTD., Shaoxing (CN); ZHEJIANG UNIVERSITY, Hangzhou (CN); XINCHANG NHU VITAMINS COMPANY LTD., Shaoxing (CN)

(72) Inventors: Jiandong Li, Shaoxing (CN); Zhirong Chen, Hangzhou (CN); Lifang Shi, Shaoxing (CN); Guodong Huang, Shaoxing (CN); Lishuang Pan, Shaoxing (CN); Hong Yin, Hangzhou (CN); Dan Qiu, Ningbo (CN); Qilei Zhang, Hangzhou (CN); Xiaoyong Zhu, Shaoxing (CN); Xiang Liu, Shaoxing (CN); Lidan Qi, Shaoxing (CN)

(73) Assignees: ZHEJIANG NHU COMPANY LTD., Shaoxing (CN); ZHEJIANG UNIVERSITY, Hangzhou (CN); XINCHANG NHU VITAMINS COMPANY LTD., Shaoxing (CN)

( * ) Notice: Subject to any disclaimer, the term of this patent is extended or adjusted under 35 U.S.C. 154(b) by 941 days.

(21) Appl. No.: 17/793,937

(22) PCT Filed: Apr. 29, 2021

(86) PCT No.: PCT/CN2021/090793
§ 371 (c)(1),
(2) Date: Jul. 20, 2022

(87) PCT Pub. No.: WO2022/021975
PCT Pub. Date: Feb. 3, 2022

(65) Prior Publication Data
US 2023/0063291 A1 Mar. 2, 2023

(30) Foreign Application Priority Data

Jul. 31, 2020 (CN) .......................... 202010756509.4

(51) Int. Cl.
*A23K 40/30* (2016.01)
*A23K 20/105* (2016.01)
(Continued)

(52) U.S. Cl.
CPC ............ *A23K 40/30* (2016.05); *A23K 20/105* (2016.05); *A23K 20/147* (2016.05); *A23K 20/158* (2016.05); *A23K 20/163* (2016.05)

(58) Field of Classification Search
None
See application file for complete search history.

(56) References Cited

U.S. PATENT DOCUMENTS 4,522,743 A 6/1985 Horn et al.
2008/0008798 A1 1/2008 Gloor et al.

FOREIGN PATENT DOCUMENTS

CN 1109329 A 10/1995
CN 101016259 A 8/2007
(Continued)

OTHER PUBLICATIONS

International Search Report of PCT/CN2021/090793.
China Office Action of 202010756509.4.

*Primary Examiner* — Jeffrey D Washville

(57) ABSTRACT

A stable carotenoid microcapsule having high bioavailability and a preparation method therefor. The method includes the following steps: a) mixing carotenoid crystals with an organic solvent, and dissolving the mixture to obtain a carotenoid solution; b) introducing the carotenoid solution and a grease into a dispersion system to fully disperse carotenoid into the grease, and vaporizing the organic solvent to obtain a carotenoid-containing dispersion liquid; c)

(Continued)

mixing the carotenoid-containing dispersion liquid and a protective colloid aqueous solution, and emulsifying the mixture to obtain an emulsion; and d) performing spray granulation and drying to obtain a carotenoid microcapsule.

17 Claims, 4 Drawing Sheets

(51) Int. Cl.
    *A23K 20/147*       (2016.01)
    *A23K 20/158*       (2016.01)
    *A23K 20/163*       (2016.01)

(56)          References Cited

FOREIGN PATENT DOCUMENTS

| | | | |
|---|---|---|---|
| CN | 102525923 A | 7/2012 | |
| CN | 102552173 A | 7/2012 | |
| CN | 106573216 A | 4/2017 | |
| CN | 111419821 A | 7/2020 | |
| KR | 20090119976 A * | 11/2009 | ........... A61K 8/9794 |
| WO | WO2012083571 A1 | 6/2012 | |

* cited by examiner

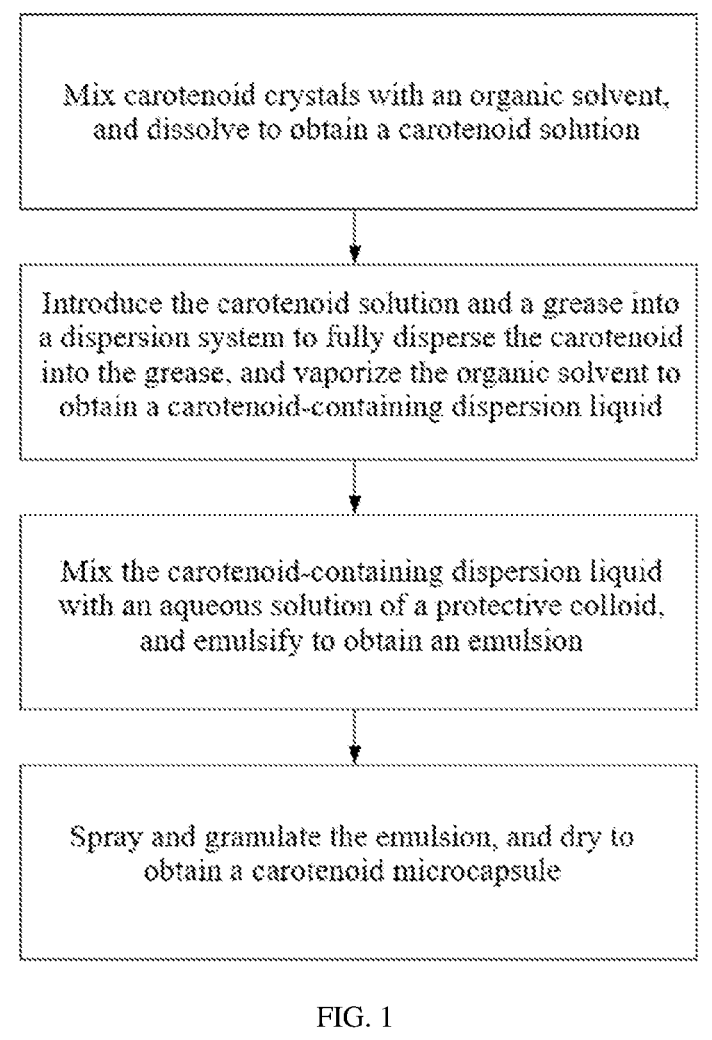

Mix carotenoid crystals with an organic solvent, and dissolve to obtain a carotenoid solution Introduce the carotenoid solution and a grease into a dispersion system to fully disperse the carotenoid into the grease, and vaporize the organic solvent to obtain a carotenoid-containing dispersion liquid Mix the carotenoid-containing dispersion liquid with an aqueous solution of a protective colloid, and emulsify to obtain an emulsion Spray and granulate the emulsion, and dry to obtain a carotenoid microcapsule

FIG. 1

STABLE CAROTENOID MICROCAPSULE HAVING HIGH BIOAVAILABILITY AND PREPARATION METHOD THEREFOR

CROSS-REFERENCE TO RELATED APPLICATIONS

The present disclosure is a National Stage application of International Application No. PCT/CN2021/090793 filed on Apr. 29, 2021, which claims all benefits accruing from China Patent Application No. 202010756509.4, filed on Jul. 31, 2020, in the China National Intellectual Property Administration, and titled "STABLE CAROTENOID MICROCAPSULE HAVING HIGH BIOAVAILABILITY AND PREPARATION METHOD THEREFOR", both of which are hereby incorporated by reference.

TECHNICAL FIELD

The present disclosure relates to a field of pharmaceutical and chemical industry, in particular to a stable carotenoid microcapsule having high bioavailability and a method for preparing the same.

BACKGROUND

Carotenoids are a class of polyene compounds having a plurality of unsaturated bonds. As one of the most important natural pigments, carotenoids have a wide range of biological activities, including various effects such as pro-vitamin A activity, antioxidant function, anti-tumor function, eye protection, cardiovascular disease prevention, osteoporosis prevention, weight loss promotion and skin protection, etc. Therefore, carotenoids have attracted more and more attention from researchers in the fields of medicine, food, fodder, aquaculture, cosmetics, and the like.

Since most carotenoids are insoluble in water and rarely soluble in vegetable oils, and they are highly unstable due to chemical substances, machinery action, light, oxygen, and heat, etc., during food processing and storage, limiting their applications in functional foods. In addition, as micronutrients, physiological efficacy of carotenoids mainly depends on their bioavailability in a body. A large number of studies have shown that a state and a particle size of carotenoids have a great influence on their bioavailability. Specifically, the smaller the particle size of carotenoid particles are, the easier they can be absorbed and utilized after being ingested by an organism, that is, the higher the bioavailability they have. Thus, people always try to reduce the particle size of carotenoids, so that the particle size of carotenoids can be micron-sized or even nanoscale. Accordingly, current developments and researches of carotenoids focus on selecting a dosage form with fine particles, good stability and high bioavailability as an intake carrier of carotenoids.

At present, a variety of health foods and dietary supplements containing one or multiple carotenoids on the market, such as tablets, hard capsules, soft capsules, and oil suspensions of carotenoids, microcapsules of carotenoids, nano emulsions of carotenoids, and liposomes of carotenoids, which can be filled in the soft capsules. However, surfactants added in preparation processes of the soft capsules, the nano emulsions and the liposomes may cause side effects and lead to anaphylactic reactions in human body. In addition, the soft capsules, the nano emulsions and the liposomes are prone to delamination, oxidation and deterioration, etc., limiting their applications.

According to molecular nutrition, in order to realize the bioavailability of carotenoids, it is necessary to avoid their destruction and degradation in a digestive tract to the greatest extent, such that the carotenoids can successfully reach an intestinal tract, and form micromicelles together with free fatty acids, monoglycerides and bile salts. As such, the carotenoids may be absorbed by small intestinal mucosal cells, and brought into various organs in the body by a lymphatic circulatory system to exert its health care effect.

In view of the defects of the conventional art and characteristics of digestion and absorption of carotenoids in the body, the present disclosure intends to find an efficient and simple method, by which an organic solvent can be quickly removed from a product, so as to obtain carotenoid preparations having small particle sizes, good embedding effect, high stability and high bioavailability.

SUMMARY

In the literature, methods for preparing carotenoid preparations in various dosage forms have been reported.

In Chinese patent No. CN101828693A, a carotenoid oil suspension with a particle size of about 10 μm was obtained by processing carotenoid crude crystals with tetrahydrofuran, ethanol and vegetable oil, etc. In Chinese patent No. CN102552173B, a carotenoid oil suspension with an average particle size of less than 5 μm was obtained by a process of introducing a carotenoid solution into vegetable oil by methods of atomization. However, uniformity and particle sizes of the carotenoids obtained in both of the above processes cannot reach an emulsion level. In addition, carotenoids have poor chemical stability in oil solution, and are prone to side reactions. Moreover, it is not convenient enough to apply oil suspension preparations in fodder, food and health care products industries.

In Chinese patent No. CN108030063A, β-carotene, monoglyceride, triglyceride and vitamin E were used as an oil phase, and the oil phase was introduced into a coil heat exchanger heated by an oil bath at a temperature in a range of 140 degrees centigrade to 250 degrees centigrade, until the β-carotene in the oil suspension was completely melted to obtain a mixture. Then, a wall material solution was added into the mixture for emulsion, and a digestion enhancer was added into the mixture, and spray-dried to obtain β-carotene microcapsules. However, a high-temperature melting method may easily lead to degradation or isomerization of nutrients at high temperature, reducing their biological activity.

In U.S. Pat. No. 3,998,753, a method for preparing water-dispersible carotenoids with particle sizes of less than 1 μm was provided. In this method, carotenoids and other additives were firstly mixed to prepare an organic solvent solution. Then the organic solvent was added into an aqueous solution containing gelatin, a dispersant and a stabilizer, and then, the system was subjected to high-speed shearing to obtain an emulsion. Thereafter, the organic solvent in the emulsion was removed, and spray dried to obtain desired powders. In U.S. Pat. No. 4,522,743, a method of preparing water-dispersible carotenoid powders was provided. In this method, carotenoids were dissolved in a volatile water-miscible solvent at a temperature in a range of 50 degrees centigrade to 200 degrees centigrade in 10 seconds to obtain a mixture, and then the mixture was rapidly mixed with an aqueous solution containing a protective colloid at a temperature in a range of 0 degree centigrade to 50 degrees centigrade, so that the carotenoids with particle sizes in a range of less than 0.5 μm were dispersed in the protective colloid system. Then, the solvent was removed from the system, and carotenoid powders could be obtained after drying. The above process should be carried out under conditions of a high pressure (in a range of 3.0 MPa and 6.0 MPa) and a high temperature (in a range of 170 degrees centigrade to 200 degrees centigrade). The process had strict requirements for equipment, and was difficult to operate and control. In addition, in the two processes of U.S. Pat. Nos. 3,998,753 and 4,522,743, a large amount of solvent should be removed from the protective colloid systems. As a result, the processes take a long time and the solvent can hardly be completely removed. Moreover, the system may easily blister when being heated and precipitated in the presence of protective colloid, with a very low efficiency of precipitation. Therefore, it is difficult to control the particle sizes and the color of the desired carotenoid powders.

In Chinese patent No. CN107669657A, carotenoids were dissolved in an organic solvent to prepare an oil phase. The oil phase was emulsified with an aqueous phase formed by dissolving an emulsion stabilizer in water. An emulsion thus obtained was heated to remove the solvent therein, and then a coating wall material was added thereto for homogenization. Thereafter, relatively stable carotenoid dry powders or particles were prepared by granulation and drying. In U.S. Pat. No. 6,936,279B2 disclosed a method for preparing a carotenoid oil suspension. In this method, carotenoids were firstly mixed with a water-insoluble solvent, then mixed with vegetable oil, and then atomized nitrogen flow. An atomized solution was collected, and the solvent therein was recovered, thus obtaining a carotenoid oil suspension. In the two methods in Chinese patent No. CN107669657A and U.S. Pat. No. 6,936,279B2, in order to ensure stability of carotenoids, it is necessary to add an emulsion stabilizer or a large amount of emulsifier and water, and in order to remove a large amount of organic solvent, it is necessary to stop the atomization operation and perform solvent recovery after collecting a certain amount of atomized "concentrate", which are unfavorable in industrial production. Therefore, the above two methods are not productive enough and only suitable for laboratory scale.

In order to solve the problems in the prior art, the applicant of the present disclosure disclosed a method of preparing water-dispersible carotenoid powders (CN100421650C) in 2005. In the method, carotenoid crystals were dissolved in halogenated hydrocarbons or ester solvent containing antioxidants and emulsifiers. A solution thus obtained was sprayed into ethanol or isopropanol which was being stirred at high speed, so that carotenoids were precipitated as amorphous powders with particle sizes in a range of less than 2 μm. The precipitated carotenoids were filtered with a filter membrane or a sintered filter rod. A filter cake thus obtained was washed with ethanol or isopropanol and drained. Thereafter, the filter cake was added into an aqueous solution containing protective colloid, stirred and beaten, and then homogenously emulsified to obtain a mixture. The residual solvent was removed from the mixture to prepare an aqueous dispersion. Finally, the aqueous dispersion was spray granulated, and then fluidized and dried to obtain a water-dispersible carotenoid preparation. In the method, the process innovation is carried out by a dual-solvent method, which greatly shortens a precipitation time. However, the particle sizes of carotenoids needs to be further refined, and the bioavailability of the carotenoids should be further improved.

The technical problem to be solved in the present disclosure is to provide a carotenoid microcapsule with a fine particle size, high bioavailability, and a good stability, and a preparation method thereof.

A preparation method for a stable carotenoid microcapsule having high bioavailability includes the following steps:

a) mixing carotenoid crystals with an organic solvent, and dissolving the carotenoid crystals in the organic solvent to obtain a carotenoid solution;

b) introducing the carotenoid solution and a hot grease into a dispersion system to fully disperse the carotenoid into the hot grease, and vaporizing the organic solvent to obtain a carotenoid-containing dispersion liquid;

c) mixing the carotenoid-containing dispersion liquid with an aqueous solution of a protective colloid to obtain a mixture, and emulsifying the mixture to obtain an emulsion; and d) spraying and granulating the emulsion, and drying to obtain the carotenoid microcapsule.

In an embodiment, the dispersion system in step b) includes a dispersing device, a container connected to the dispersing device, a conveying device and a heating device. The dispersing device is configured for mixing the carotenoid solution obtained in step a) with the hot grease or a circulating material to fully the disperse carotenoid into the hot grease. The conveying device is configured for conveying a substance in the dispersion system. The heating device is configured for heating a grease or the circulating material to obtain a liquid hot grease or a liquid circulating material.

In an embodiment, the dispersing device includes a contact portion, a constriction portion, and an expansion portion connected and communicated with each other in sequence.

The contact portion is provided with a spray port and an atomization port. The spray port is configured to introduce the liquid hot grease or the liquid circulating material into the contact portion. The atomization port is configured to transform the carotenoid solution obtained in step a) into tiny carotenoid droplets, so that the carotenoid droplets are capable of being mixed with the liquid hot grease or the liquid circulating material in the contact portion, an organic solvent in the carotenoid droplets is capable of being vaporized, thereby forming carotenoid particles which are dispersed in the hot grease.

The constriction portion is configured to mix the carotenoid droplets formed in the contact portion with the liquid hot grease and make the organic solvent in the carotenoid droplets vaporized, such that a resulting material is introduced into the expansion portion, and then introduced into the container communicated with the dispersing device.

In an embodiment, the container connected to the dispersing device further includes a vacuum port configured for discharging the vaporized organic solvent from the container.

In an embodiment, the dispersion system is a continuous operation system or a batch operation system.

In an embodiment, a residence time of the substance in the dispersion system is in a range of less than or equal to 20 hours, optionally, less than or equal to 10 hours.

In an embodiment, a temperature of the hot grease is in a range of 60 degrees centigrade to 100 degrees centigrade.

In an embodiment, in step b), in step b), vaporizing and removing a part of the organic solvent in the carotenoid solution, wherein a content of a first residual organic solvent in the carotenoid-containing dispersion liquid is less than 1%. Optionally, a content of a first residual organic solvent in the carotenoid-containing dispersion liquid is less than 0.5%. Optionally, a content of a first residual organic solvent in the carotenoid-containing dispersion liquid is less than 0.2%.

In one of the embodiments, step c) further includes a step of removing a second residual organic solvent in the emulsion after emulsifying the mixture.

In an embodiment, in step b), the carotenoid-containing dispersion liquid comprises the carotenoid particles and dissolved carotenoids. In some embodiments, an average particle size of the carotenoid particles in the carotenoid-containing dispersion liquid is in a range of 0.05 μm to 0.2 μm.

In an embodiment, in the step b), a mass ratio of the hot grease to the carotenoid crystals is in a range of 0.7:1 to 20:1, optionally, 1:1 to 10:1.

In an embodiment, in step c), the emulsifying the mixture is processed by a method which is one or more selected from a group consisting of high pressure homogeneous emulsification, an in-line pipeline high shear emulsification, a super-gravity emulsification, and static mixing.

In an embodiment, the protective colloid may be selected from one or more selected from a group consisting of gelatin, starch octenyl succinate, gum arabic, sodium ligno-sulfonate, calcium lignosulfonate, sodium polyacrylate, and sodium carboxymethylcellulose.

In an embodiment, after the emulsifying the mixture in step c), the carotenoid-containing dispersion liquid is dispersed in the protective colloid to form a dispersed phase, and an average particle size of the dispersed phase is less than 0.7 μm. The dispersed phase includes at least one kind of carotenoid particle and at least one kind of grease and the carotenoid particle is nanometer-sized, dispersed in and encapsulated by the grease.

In an embodiment, the organic solvent of step a) may be selected from one or more selected from a group consisting of chloroform, dichloromethane, ethyl acetate, propyl acetate, acetone, and propanol.

In an embodiment, a mass ratio of the organic solvent to the carotenoid crystals in step a) is in a range of 100:1 to 2000:1.

In an embodiment, in step a), antioxidants are added to the carotenoid solution, and the antioxidants may be selected from one or more selected from a group consisting of TBHQ (tert-butyl hydroquinone), VC-palmitate (Vitamin C-palmitate), tocopherol, rosemary, tea polyphenol, propyl gallate, BHT (Butylated hydroxytoluene), sodium ascorbate, ascorbic acid, and ethoxyquin; and/or, a mass ratio of the antioxidants to the carotenoid crystals is in a range of 0.1:1 to 3:1.

In an embodiment, the hot grease in the step b) may be physiologically acceptable, and the physiologically acceptable grease may be selected from one or more selected from a group consisting of wax, vegetable oil, and hydrogenated vegetable oil.

In an embodiment, the wax may be selected from one or more selected from a group consisting of beeswax, carnauba wax, candelilla wax, ceresine wax, montan ester wax, rice germ oil wax, spermaceti, lanolin wax, jojoba wax, Sasol wax, and Japan wax, optionally, beeswax; and/or, the vegetable oil may be selected from one or more selected from a group consisting of corn oil, soybean oil, sunflower oil, olive oil, coconut oil, rape oil, cottonseed oil, palm oil, palm stearin, and cocoa butter; and/or, the hydrogenated vegetable oil may be selected from one or more selected from a group consisting of hydrogenated cottonseed oil, hydrogenated palm oil, and hydrogenated soybean oil.

In an embodiment, the carotenoid crystals of step a) may be selected from one or more selected from a group consisting of β-carotene, lutein, zeaxanthin, lycopene, canthaxanthin, astaxanthin, capsanthin, limocitrin, β-apo-8'-carotene aldehyde, and β-apo-8'-carotene ethyl ester.

A stable carotenoid microcapsule having a high bioavailablity obtained by the method of the carotenoid microcapsule is provided, which comprises a dispersed phase and the protective colloid. The dispersed phase of the carotenoid microcapsule is dispersed in the protective colloid, and an average particle size of the dispersed phase is in a range of less than or equal to 0.7 μm. The dispersed phase includes at least one kind of carotenoid particle and at least one kind of grease. The carotenoid particle is nanometer-sized, dispersed in and encapsulated by the hot grease.

In the process of the present disclosure, carotenoid crystals can be pre-dissolved in an organic solvent containing an antioxidant to obtain a carotenoid solution. The carotenoid solution can be then atomized into tiny droplets with a dispersion system, and mixed with a hot grease or a circulating material in a liquid state. The hot grease or the circulating material introduced from a spray port produce a negative pressure, and a temperature of the hot grease or the circulating material is higher than a boiling point of the organic solvent. Thus, the organic solvent is rapidly vaporized when comes into contact with droplets formed of the carotenoid solution, thereby forming carotenoid particles which are dispersed in the grease. The carotenoid in the solution is precipitated and grown in a molecular state. Since the residual solvent and the hot grease in the dispersion liquid system still have certain solubility in carotenoid, the precipitation of the carotenoid was obviously inhibited. Accordingly, under a condition of high-speed mixing, the particle size of the carotenoid can be controlled at nanoscale. Further, when substances formed in the contact portion of the dispersing device enters the constriction portion of the dispersing device, the carotenoid solution droplets are further mixed with the oil, so that the organic solvent in the droplets is evaporated to obtain a carotenoid-containing dispersion liquid. During this process, aggregation and enlargement of the carotenoid-containing dispersion liquid are avoided, and the vaporized organic solvent is discharged from the system via the vacuum port in the container connected with the dispersing device. Compared with a conventional method (the carotenoid solution is emulsified and desolubilized at atmospheric pressure in the presence of a water-soluble colloid), the carotenoid in the carotenoid-containing dispersion liquid formed by the present disclosure can reach the level of fine particles.

The obtained carotenoid-containing dispersion liquid is mixed and emulsified with an aqueous solution of protective colloid, and the remaining solvent is removed, and then granulated. The carotenoid particles in the microcapsules are encapsulated in the grease in a form of dispersed nanoparticles. The presence of the grease can provide dense protection for the carotenoid particles in the microcapsules, isolate oxygen, such that the product may have better processing stability.

In the present disclosure, after the microcapsules are ingested by the animal body, in a strongly acidic gastric juice environment, the presence of the grease can isolate a destructive effect of the gastric acid on the carotenoids, so that the product may have a better chemical stability. Then, the carotenoid particles and the grease are decomposed in the small intestine, and are emulsified by bile together with other lipids to form micelles, which freely diffuse into the intestinal mucosal cells. Since the carotenoid particles have small particle size, they may be more easily emulsified by bile together with lipids in the feed when encapsulated in the grease. Therefore, the carotenoid particles can be more effectively formed into micelles and then digested by animals, and the product may have high bioavailability.

The present disclosure can have at least the following benefits.

1) A hot grease is used for dispersion, the residual solvent and the hot grease in the dispersion liquid system still have a certain solubility in carotenoids, which may lead to an obvious inhibition of the precipitation of the carotenoids. Under the condition of high-speed mixing, the particle size can be controlled at nanoscale.

2) The organic solvent of the present disclosure is removed in the dispersion system, which can greatly simplify the operation steps.

3) The carotenoid particles in the microcapsules of the present disclosure are encapsulated in grease in a form of dispersed nano-particles, and the presence of the grease can provide dense protection for the carotenoid particles in the microcapsules and isolate oxygen, such that the product has a better processing stability.

4) After the microcapsules of the present disclosure are ingested by animals, in a strongly acidic gastric juice environment, the presence of the grease can isolate a destructive effect of the gastric acid on the carotenoids, so that the product may have a better chemical stability.

Since the carotenoid particles of the present disclosure have small particle sizes and are encapsulated by the grease, they may be more easily emulsified by bile together with lipids in the feed, formed into micelles and then digested by animals, so that the product may have high bioavailability.

BRIEF DESCRIPTION OF THE DRAWINGS

FIG. 1 is a schematic flowchart of a method for preparing carotenoid microcapsules in an embodiment of the present disclosure.

DETAILED DESCRIPTION

Figure 2:
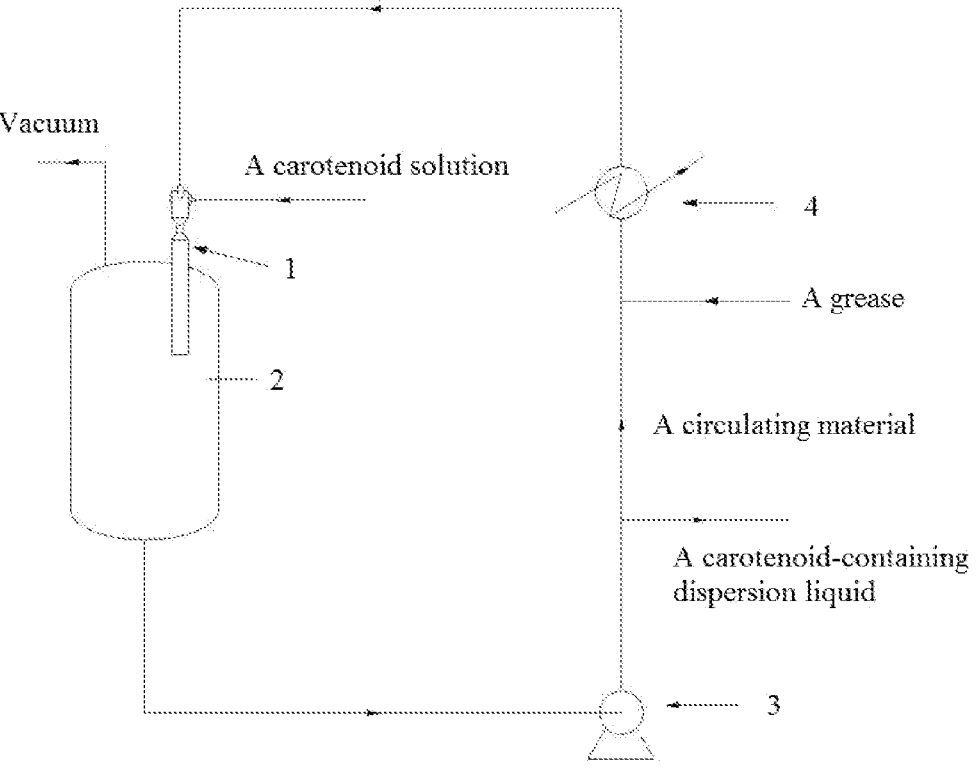
FIG. 2 is a schematic structural diagram of a dispersion system in an embodiment of the present disclosure, wherein callout 1 represents a dispersing device; callout 2 represents a container; callout 3 represents a conveying device; and callout 4 represents a heating device.

In order to facilitate understanding of the present disclosure, the present disclosure will be more fully described below with reference to the related drawings, which present some embodiments of the present disclosure. However, the present disclosure may be implemented in many different forms and is not limited to the embodiments described herein. Rather, these embodiments are provided for a more thorough and complete understanding of the disclosure of the present disclosure. Based on the embodiments in the present disclosure, all other embodiments obtained by one of ordinary skill in the art without creative work fall within the protection scope of the present disclosure.

Unless otherwise defined, all technical and scientific terms used herein have the same meaning as commonly understood by one of ordinary skill in the technical field to which the present disclosure pertains. As used herein, the terms used in the specification of the present disclosure are for the purpose of describing specific embodiments only, and are not intended to limit the present disclosure. As used herein, the term "and/or" includes any and all combinations of one or more of the associated listed items.

Referring to FIG. 1, the present disclosure provides a method for preparing carotenoid microcapsules, which can include the following steps:

a) mixing carotenoid crystals with an organic solvent, and dissolving the carotenoid crystals in the organic solvent to obtain a carotenoid solution;

b) introducing the carotenoid solution and a hot grease into a dispersion system to fully disperse the carotenoid into the hot grease, and vaporizing the organic solvent to obtain a carotenoid-containing dispersion liquid;

c) mixing the carotenoid-containing dispersion liquid with an aqueous solution of a protective colloid to obtain a mixture, and emulsifying the mixture to obtain an emulsion; and d) spraying and granulating the emulsion, and drying to obtain the carotenoid microcapsule.

In the present disclosure, unless otherwise specified, raw materials (e.g., organic solvent and grease, etc.) used herein are all physiologically acceptable substances.

The term "at least most of" refers to greater than 50%. In some embodiments, the term "at least most of" refers to greater than or equal to 60%, greater than or equal to 70%, greater than or equal to 80%, greater than or equal to 90%, greater than or equal to 95%, greater than or equal to 96%, greater than or equal to 97%, greater than or equal to 98%, or greater than or equal to 99%.

In the present disclosure, the hot grease is configured to disperse carotenoids. The hot grease and some of the organic solvent in the dispersion liquid system still have certain solubility in carotenoids, resulting in an obvious inhibition of the precipitation of the carotenoids. Under high-speed mixing conditions, particle sizes of carotenoids can be controlled at the nanoscale. In addition, presence of the grease may further provide a dense protection for the carotenoid particles therein, isolate oxygen and gastric acid, such that products have better processing stability and chemical stability. Compared with a conventional solvent method or grinding method in the prior art, the particle size of the carotenoid particles in the carotenoid microcapsules obtained in the present disclosure is controlled to be smaller, and the carotenoid particles are coated with grease, and thus are more easily to be emulsified by bile together with the lipids in the feed. Therefore, the carotenoid particles may be more effectively formed into micelles to be absorbed by animals, such that the product may have high bioavailability.

In an embodiment, the carotenoid crystals of step a) may be selected from one or more selected from a group consisting of β-carotene, lutein, zeaxanthin, lycopene, canthaxanthin, astaxanthin, capsanthin, limocitrin, β-apo-8'-carotene aldehyde, and β-apo-8'-carotene ethyl ester.

In an embodiment, the organic solvent of step a) may be selected from one or more selected from a group consisting of chloroform, dichloromethane, ethyl acetate, propyl acetate, acetone, and propanol.

In an embodiment, a mass ratio of the organic solvent to the carotenoid crystals in step a) may be in a range of 100:1 to 2000:1. Specifically, the mass ratio of the organic solvent to the carotenoid crystals may be in a range of 100:1 to 500:1, 500:1 to 800:1, 800:1 to 1000:1, 1000:1 to 1200:1, 1200:1 to 1400:1, 1400:1 to 1700:1, or 1700:1 to 2000:1.

In an embodiment, antioxidants are added to the carotenoid solution, and the antioxidants may be selected from one or more selected from a group consisting of TBHQ (tert-butyl hydroquinone), VC-palmitate, tocopherol, rosemary, tea polyphenol, propyl gallate, BHT (Butylated hydroxytoluene), sodium ascorbate, ascorbic acid, and ethoxyquin. In an embodiment, a mass ratio of the antioxidants to the carotenoid crystals may be in a range of 0.1:1 to 3:1.

In an embodiment, the carotene crystals may be completely dissolved in the organic solvent by heating.

In an embodiment, the grease in the step b) may be physiologically acceptable grease, and the physiologically acceptable grease may be selected from one or more selected from a group consisting of wax, vegetable oil, and hydrogenated vegetable oil. In an embodiment, the wax may be selected from one or more selected from a group consisting of beeswax, carnauba wax, candelilla wax, ceresine wax, montan ester wax, rice germ oil wax, spermaceti, lanolin wax, jojoba wax, Sasol wax, and Japan wax, optionally, beeswax. In an embodiment, the vegetable oil may be selected from one or more selected from a group consisting of corn oil, soybean oil, sunflower oil, olive oil, coconut oil, rape oil, cottonseed oil, palm oil, palm stearin, and cocoa butter. In an embodiment, the hydrogenated vegetable oil may be selected from one or more selected from a group consisting of hydrogenated cottonseed oil, hydrogenated palm oil, and hydrogenated soybean oil.

In an embodiment, a temperature of the hot grease may be in a range of 60 degrees centigrade to 100 degrees centigrade. Specifically, the temperature of the hot grease may be in a range of 60 degrees centigrade to 70 degrees centigrade, 70 degrees centigrade to 80 degrees centigrade, 80 degrees centigrade to 90 degrees centigrade, or 90 degrees centigrade to 100 degrees centigrade.

Figure 3:
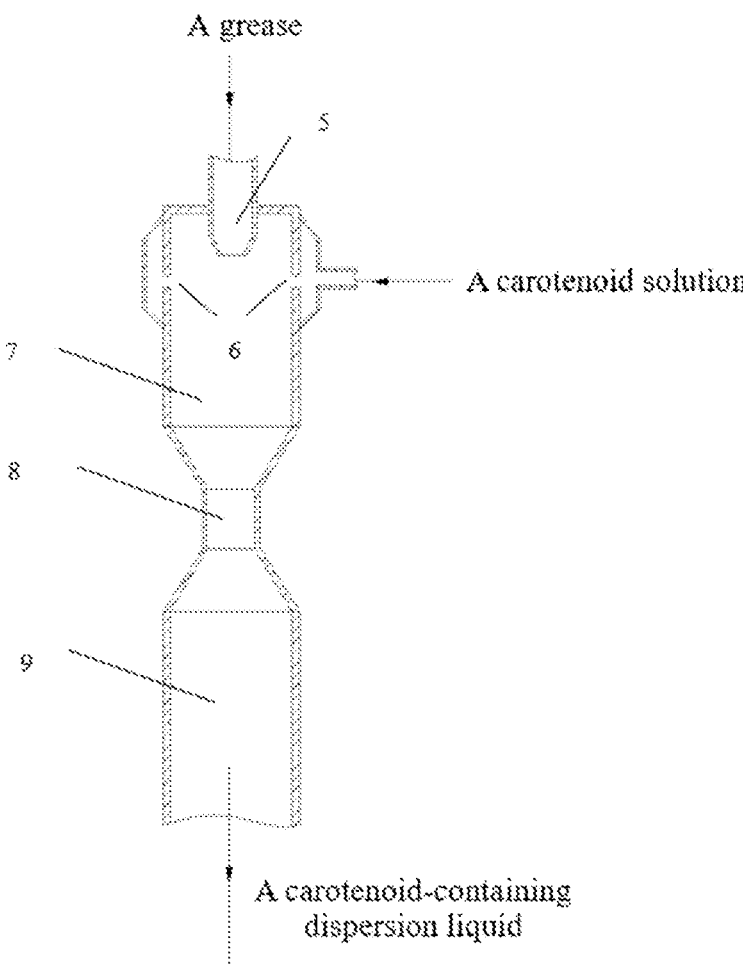
FIG. 3 is a schematic diagram of a dispersing device in an embodiment of the present disclosure, wherein callout 5 represents a spray port; callout 6 represents an atomization port; callout 7 represents a contact portion; callout 8 represents a contraction portion; and callout 9 represents an expansion portion.

Referring to FIG. 2 and FIG. 3, in an embodiment, the dispersion system in step b) can include a dispersing device 1, a container 2 connected to the dispersing device 1, a conveying device 3 and a heating device 4. The dispersing device 1 is configured for mixing the carotenoid solution obtained in step a) with the hot grease or a circulating material to fully disperse the carotenoid into the hot grease. The conveying device 3 is configured conveying the circulating substances in the dispersion system. The heating device 4 is configured for heating a grease or the circulating material, such that the grease or the circulating material is in a liquid state. Optionally, the dispersion system is a circulating transmission system, that is, substances in the dispersing device may enter into the container, and the substances in the container may be circulated back into the dispersing device. The circulating material refers to components of the carotenoid solution that are transported in the dispersion system again after the organic solvent has been removed through the dispersing device one or more times.

In an embodiment, the dispersing device 1 can include a contact portion 7, a constriction portion 8, and an expansion portion 9 connected and communicated with each other in sequence. The contact portion 7 can be provided with a spray port 5 and an atomization port 6. The spray port 5 can be configured to introduce heated liquid hot grease or a circulating material into the contact portion 7. The atomization port 6 is configured to transform the carotenoid solution obtained in step a) into tiny carotenoid droplets, so that the carotenoid droplets are capable of being mixed with the liquid hot grease or the liquid circulating material in the contact portion 7, an organic solvent in the carotenoid droplets is capable of being vaporized, thereby forming carotenoid particles which are dispersed in the grease.

The constriction portion 8 can be configured to mix the carotenoid droplets formed in the contact portion 7 with the liquid hot grease and make the organic solvent in the carotenoid droplets vaporized, such that a resulting material is introduced into the expansion portion 9, and then introduced into the container 2 communicated with the dispersing device 1.

In an embodiment, the container 2 connected with the dispersing device 1 may further include a vacuum port, and the vaporized organic solvent is discharged from the container 2 through the vacuum port.

In an embodiment, the dispersion system may be a continuous operation system or a batch operation system. In a continuous operation, the carotenoid solution continuously enters into the dispersion system for processing, for example, as shown in Embodiment 7, the carotenoid solution continuously enters into the dispersion system at a predetermined speed. In a batch operation, as shown in Embodiment 1, the carotenoids are fed into the dispersion system at one time, and substances that have been reacted in the dispersion system undergo subsequent steps to obtain an emulsion, and then the emulsion is granulated to obtain carotenoid microcapsules.

In an embodiment, a residence time of the substances in the dispersion system is less than or equal to 20 hours, optionally, less than or equal to 10 hours.

Referring to FIG. 3, in an embodiment, in step b), the hot grease or the circulating material enters the contact portion 7 of the dispersing device 1 through the spray port 5, and comes into contact with droplets of the carotenoid solution formed through the atomization port 6 of the dispersing device 1. Since a temperature of the hot grease or the circulating material is higher than a boiling point of the organic solvent, the organic solvent in the carotenoid solution is rapidly vaporized when the grease or the circulating material is in contact with the atomized droplets, thus forming carotenoid particles which are dispersed in the grease. After the resulting substances enters the container 2 through the constriction portion 8 and the expansion portion 9, the vaporized organic solvent is discharged through the vacuum port above the container 2, thereby obtaining a carotenoid-containing dispersion liquid. The carotenoid-containing dispersion liquid is circulated and reciprocated through the conveying device 3, and when the carotenoid particles in the dispersion liquid reached to a particle size of 0.05 μm to 0.2 μm, the substances are discharged, so as to perform step c).

Optionally, in step b), at least most of the organic solvent in the carotenoid solution is removed. Optionally, in step b), a part of the organic solvent in the carotenoid solution is evaporated and removed, and the residual organic solvent may be removed after emulsifying the mixture. A part of the organic solvent and the hot grease in the dispersion liquid still have certain solubility in the carotenoids, resulting in an obvious inhibition of the precipitation of the carotenoids. Under a condition of high-speed mixing, a particle size of the carotenoid particles may be controlled at nano-scale. In an embodiment, a mass percentage of the organic solvent removed in step b) is greater than 99%. In an embodiment, after spraying, the carotenoid solution comes into contact with the hot grease, and a part of the organic solvent is removed under a negative pressure system. A specific removal time is determined according to an actual amount of solvent, requirements of removal ratio, and an actual condition of the system.

In an embodiment, a mass content of the residual organic solvent in the carotenoid-containing dispersion liquid is controlled to be in a range of less than 1% (i.e., less than or equal to 1%), optionally, less than 0.5% (i.e., less than or equal to 0.5%), optionally, less than 0.2% (i.e., less than or equal to 0.2%). In an embodiment, step c) may further include a step of removing the residual organic solvent in the emulsion after emulsification. A specific method of removing the residual organic solvent may be a conventional method, such as vacuum desolventizing. A specific removing time may be determined according to an actual amount of the remaining solvent and an actual condition of system.

In an embodiment, the carotenoids are present in the carotenoid-containing dispersion liquid obtained in step b) in a state of partial dissolution and dispersed particles. Optionally, at least most of the carotenoids are present in the carotenoid-containing dispersion liquid in a state of dispersed particles, that is, most of the carotenoids are dispersed in granular form, and a small part of the carotenoids are dissolved in the carotenoid-containing dispersion liquid. Optionally, more than 80% of the carotenoids are present in the carotenoid-containing dispersion liquid in a state of dispersed particles.

In an embodiment, an average particle size of the carotenoid particles in the carotenoid-containing dispersion liquid may be in a range of 0.05 $\mu$m to 0.2 $\mu$m. Specifically, the average particle size of the carotenoid particles may be in a range of 0.05 $\mu$m to 0.1 $\mu$m, 0.1 $\mu$m to 0.15 $\mu$m, or 0.15 $\mu$m to 0.2 $\mu$m.

In an embodiment, a mass ratio of the hot grease and the carotenoid crystals may be in a range of 0.7:1 to 20:1. Specifically, the mass ratio of the hot grease and the carotenoid crystals may be in a range of 0.7:1 to 1:1, 1:1 to 5:1, 5:1 to 10:1, 10:1 to 15:1, 15:1 to 20:1. Optionally, the mass ratio of hot grease and the carotenoid crystals may be in a range of 1:1 to 10:1.

In an embodiment, the emulsification method in step c) may be one or more selected from a group consisting of a high pressure homogeneous emulsification, an in-line pipeline high shear emulsification, a supergravity emulsification, and a static mixing. Optionally, the emulsification method may be a high pressure homogeneous emulsification.

In an embodiment, the protective colloid may be selected from one or more selected from a group consisting of gelatin, starch octenyl succinate, gum arabic, sodium lignosulfonate, calcium lignosulfonate, sodium polyacrylate, and sodium carboxymethylcellulose.

In a process of the present disclosure, carotenoid crystals are pre-dissolved in an organic solvent containing an antioxidant to obtain a carotenoid solution, which is then atomized into droplets through a dispersion system, and comes into contact with the hot grease in a sprayed state. During this process, the organic solvent in the carotenoid solution evaporates rapidly, so that the carotenoid in the carotenoid solution is precipitated and grown in a molecular state. The residual solvent and the hot grease in the dispersion liquid system still have certain solubility in carotenoid, resulting in an obvious inhibition of the precipitation of the carotenoids. Under a condition of high-speed mixing, the particle size of the carotenoid can be controlled at nanoscale. In addition, compared with a conventional method in which the carotenoid solution is emulsified while being desolventized at atmospheric pressure in the presence of water-soluble colloid, the organic solvent of the present disclosure is removed simultaneously, which can greatly simplify the operation steps.

The obtained dispersion liquid is mixed and emulsified with an aqueous solution of protective colloid, and the remaining solvent is removed. Thereafter, the resultant is granulated. The presence of the grease in the product may further provide dense protection for the carotenoid particles therein.

In an embodiment, after the emulsification in step c), the dispersion liquid is dispersed in the protective colloid. An average particle size of a dispersed phase of the protective colloid in which the dispersion liquid was dispersed is less than 0.7 $\mu$m. The dispersed phase includes at least one kind of carotenoid particle or at least one kind of grease in which the carotenoid particle is encapsulated in a form of dispersed nano-particles.

In an embodiment, the spraying and granulating process in step d) is performed in the presence of a coating material. Optionally, the coating material is selected from corn starch, silicon dioxide, tricalcium phosphate, and mixtures thereof.

In an embodiment, the drying method in step d) may be fluidized bed drying.

Figure 4:
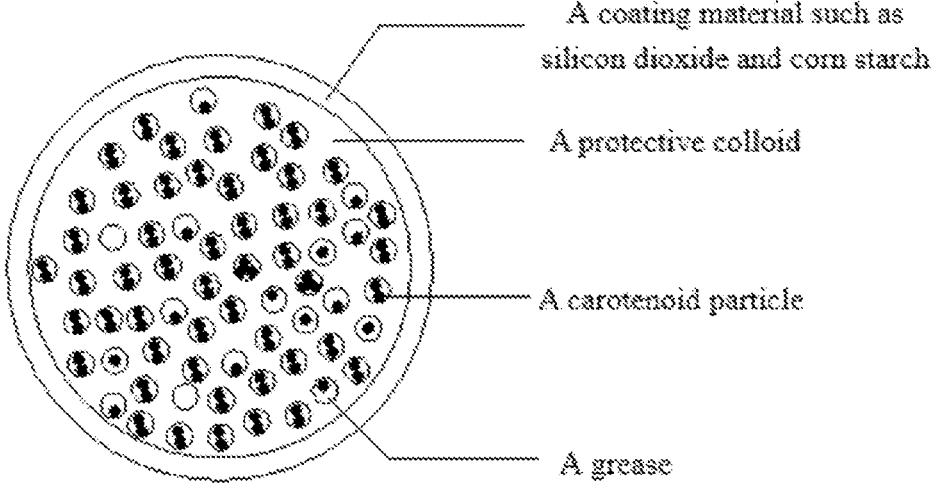
FIG. 4 is a schematic structural diagram of carotenoid microcapsules in an embodiment of the present disclosure.

In an embodiment, the emulsion is fed into a spray granulation tower, and spray granulated in the presence of a coating material, and then dried to form carotenoid microcapsules coated with the coating material. The embodiments of the present disclosure also provide carotenoid microcapsules prepared by the method for preparing carotenoid microcapsules in any of the above embodiments. The dispersed phase of the carotenoid microcapsules is dispersed in the protective colloid, and an average particle size of the dispersed phase is less than 0.7 $\mu$m. The dispersed phase contains at least one kind of carotenoid particle and at least one kind of grease in which the carotenoid particle is encapsulated in a form of dispersed nano-particles. For details, please refer to FIG. 4.

In an embodiment, an average particle size of the carotenoid particles in the carotenoid microcapsules may be in a range of 0.05 $\mu$m to 0.1 $\mu$m, 0.1 $\mu$m to 0.15 $\mu$m, or 0.15 $\mu$m to 0.2 $\mu$m.

In an embodiment, the particle size of the dispersed phase of the carotenoid microcapsules may be in a range of 0.3 $\mu$m to 0.4 $\mu$m, 0.4 $\mu$m to 0.5 $\mu$m, 0.5 $\mu$m to 0.6 $\mu$m, or 0.6 $\mu$m to 0.7 $\mu$m.

In the present disclosure, "an average particle size of the carotenoid in the dispersion liquid" refers to an average particle size of the carotenoid particles dispersed in the dispersion liquid. "An average particle size of the dispersed phase of the emulsion" refers to an average particle size of the grease in which the carotenoid particles are encapsulated in the emulsion. "An average particle size of the dispersed phase of the microcapsules" refers to an average particle size of the grease in which the carotenoid particles are encapsulated when the microcapsules are re-dispersed in water. "An average particle size of the carotenoid particles in the microcapsules" refers to an average particle size of the carotenoid particles encapsulated in the grease when the microcapsules are re-dispersed in water. The above average particle size may be detected by a laser particle size analyzer, a particle imager, or the like.

In one or more embodiments of the present disclosure, in order to measure stability of the carotenoid microcapsules prepared in the present disclosure, products prepared in one or more embodiments are mixed with other feed raw materials, then conditioned, puffed, granulated and dried. Thereafter, retention of the carotenoids in the feed after drying is determined.

In order to evaluate bioavailability of the products, the carotenoid microcapsules prepared in one or more embodiments are added to commercial feed, and processed into feed by puffing. The obtained feed is configured to feed rainbow trout for 8 weeks to compare muscle coloring effects of the rainbow trout.

The specific embodiments are as follows.

Embodiment 1

2.5 kg of astaxanthin crystals, 0.3 kg of tocopherol, and 250 kg of dichloromethane were mixed, and heated to a temperature of 40 degrees centigrade to prepare 0.99% of an astaxanthin solution. 1 kg of tocopherol was added to 5 kg of soybean oil to obtain a mixture. The mixture was heated to 80 degrees centigrade with a heating device and a circulating pump, and then introduced into a dispersing device through a spray port. The astaxanthin solution entered the dispersing device through an atomization port, and contacted and mixed with liquid circulating material. Meanwhile, the dichloromethane was rapidly vaporized, and resulting substances entered a container communicated with the dispersing device. The pressure in the container being kept negative, the vaporized dichloromethane was discharged through a vacuum port, cooled with a heat exchanger, and then recycled and stored into a storage tank. As such, the dichloromethane could be recycled. A dispersion liquid of the astaxanthin, the tocopherol, the solvent, and the soybean oil was obtained in the container, and then circulated into the dispersing device from the spray port through a conveying device, and contacted with the astaxanthin solution entered from the atomization port. This process was repeated until the astaxanthin solution was completely delivered. Finally, 8.8 kg of the dispersion liquid of astaxanthin, tocopherol, the solvent, and the soybean oil was obtained. In the dispersion liquid, a content of the astaxanthin was 28.4% (by mass), a content of a residual solvent was 0.16% (by mass), and an average particle size of the astaxanthin was 0.171 μm.

10 kg of gelatin was dissolved in 40 kg of water and cooled to a temperature of 40 degrees centigrade. The above dispersion liquid was mixed with the aqueous gelatin solution, and emulsified at a high shear speed for 30 min to obtain an emulsion in which an average particle size of a dispersed phase was 0.501 μm. The emulsion was desolventized in vacuum for 1 hour, then granulated in a spray granulator, and dried in a fluidized bed to obtain microcapsules containing 10.9% of the astaxanthin. In the microcapsules, an average particle size of a dispersed phase of was 0.512 μm, and an average particle size of astaxanthin particles was 0.176 μm. No dichloromethane residue was detected in the product.

Embodiment 2

2.5 kg of astaxanthin crystals, 1 kg of ascorbyl palmitate, and 300 kg of acetone were mixed, and heated to a temperature of 55 degrees centigrade to prepare 0.82% of an astaxanthin solution. 7.5 kg of beeswax was heated up to 100 degrees centigrade with a heating device, and then introduced into a dispersing device through a spray port. The astaxanthin solution entered the dispersing device through an atomization port, and contacted and mixed with the beeswax in a spray state, meanwhile, the acetone was rapidly vaporized, and resulting substances entered a container communicated with the dispersing device. The pressure in the container being kept negative, the vaporized acetone was discharged through a vacuum port, and cooled with a heat exchanger, and then recycled and stored into a storage tank. As such, the acetone could be recycled. A dispersion circulating liquid of astaxanthin, ascorbyl palmitate, solvent, and beeswax was obtained in the container, and then circulated into the dispersing device from the spray port through a conveying device, and contacted with the astaxanthin solution entered from the atomization port. This process was repeated until the astaxanthin solution was completely delivered. Finally, 11 kg of the dispersion liquid of astaxanthin, ascorbyl palmitate, solvent, and beeswax was obtained. In the dispersion liquid, a content of the astaxanthin is 22.7% (by mass), a content of a residual solvent was 0.13% (by mass), and an average particle size of the astaxanthin was 0.166 μm.

12.5 kg of sodium starch octenyl succinate was dissolved in 60 kg of water, while keeping a temperature at 65 degrees centigrade. The above dispersion liquid was mixed with the aqueous solution of sodium starch octenyl succinate, and homogenized at a high pressure of 500 bar for 30 min to obtain an emulsion in which an average particle size of a dispersed phase was 0.478 μm. The emulsion was desolventized in vacuum for 1 hour, then granulated in a spray granulator, and dried in a fluidized bed to obtain microcapsules containing 9.0% of astaxanthin. In the microcapsules, an average particle size of a dispersed phase was 0.481 μm, and an average particle size of astaxanthin particles was 0.168 μm. No acetone residue was detected in the product.

Embodiment 3

2.5 kg of astaxanthin crystals, 1 kg of BHT, and 400 kg of dichloromethane were mixed, and heated to a temperature of 40 degrees centigrade to prepare 0.62% of an astaxanthin solution. 10 kg of corn oil was heated up to 90 degrees centigrade with a heating device, and then introduced into a dispersing device through a spray port. The astaxanthin solution was introduced into the dispersing device through an atomization port, and contacted and mixed with the corn oil in a spray state, meanwhile, the dichloromethane was rapidly vaporized, and resulting substances entered a container communicated with the dispersing device. The pressure in the container being kept negative, the vaporized dichloromethane was discharged through a vacuum port, and cooled with a heat exchanger, and then recycled and stored into a storage tank. As such, the dichloromethane could be recycled. A mixed dispersion circulating liquid of astaxanthin, BHT, solvent, and corn oil was obtained in the container, and then circulated into the dispersing device from the spray port through a conveying device, and contacted with the astaxanthin solution entered from the atomization port. This process was repeated until the astaxanthin solution was completely delivered. Finally, 13.5 kg of a dispersion liquid of astaxanthin, BHT, solvent, and corn oil was obtained. In the dispersion liquid, a content of astaxanthin was 18.5% (by mass), a content of a residual solvent was 0.15% (by mass), and an average particle size of the astaxanthin was 0.161 μm.

15 kg of calcium lignosulfonate was dissolved in 35 kg of water, while keeping a temperature at 40 degrees centigrade. The above dispersion liquid was mixed with the aqueous solution of calcium lignosulfonate, and homogenized at a high pressure of 800 bar for 20 min to obtain an emulsion in which an average particle size of a dispersed phase was 0.435 μm. The emulsion was desolventized in vacuum for 1 hour, then granulated in a spray granulator, and dried in a fluidized bed to obtain microcapsules containing 7.2% of astaxanthin. In the microcapsules, an average particle size of a dispersed phase was 0.441 μm, and an average particle size of astaxanthin particles was 0.162 μm. No dichloromethane residue was detected in the product.

Embodiment 4

Astaxanthin crystals, tocopherol, and dichloromethane were mixed in a mass ratio of 1:0.2:400, and heated to 40 degrees centigrade to prepare 0.25% of an astaxanthin solution. The astaxanthin solution then entered a dispersing device through an atomization port at a flow rate of 35 kg/hour. Meanwhile, rape oil was heated up to 100 degrees centigrade with a heating device at a flow rate of 0.35 kg/hour together with a circulating dispersion liquid, and then introduced into the dispersion device through a spray port to come into contact and mix with atomized astaxanthin solution. The dichloromethane was rapidly vaporized, and resulting substances entered a container communicated with the dispersing device. A pressure in the container being kept negative, the vaporized dichloromethane was continuously discharged via a vacuum port, and cooled with a heat exchanger, and then recycled and stored into a storage tank. As such, the dichloromethane could be recycled. A mixed dispersion circulating liquid of astaxanthin, tocopherol, solvent, and rape oil was obtained in the container, and then circulated into the dispersing device from the spray port through a conveying device, and contacted and mixed with the astaxanthin solution entered from the atomization port. After the system was stabilized, a dispersion liquid having a flow rate of 0.455 kg/hour and a content of 19.2% (by mass) of the astaxanthin was obtained. A residence time of the astaxanthin in the dispersion system was 10 hours. Thereafter, the dispersion liquid was poured into a transfer kettle. In the dispersion liquid, a content of a residual solvent was 0.12% (by mass), and an average particle size of the astaxanthin was 0.102 μm.

Sodium lignosulfonate was dissolved in water to prepare an aqueous solution in which a content of the sodium lignosulfonate was 35% (by mass). The aqueous solution was kept at a temperature of 40 degrees centigrade for use. The dispersion liquid with a content of 20% (by mass) of the astaxanthin was sent to a supergravity rotating packed bed beater at a flow rate of 0.455 kg/hour, and the prepared aqueous solution of sodium lignosulfonate was simultaneously sent to the supergravity rotating packed bed beater at a flow rate of 2.82 kg/hour, so as to obtain an emulsion with a flow rate of about 3.28 kg/hour. An average particle size of a dispersed phase in the emulsion was 0.236 μm. The emulsion was continuously fed into a spray granulator for granulation, and dried in a fluidized bed to obtain microcapsules with a content of 5.6% (by mass) of astaxanthin. An average particle size of a dispersed phase of the microcapsules was 0.241 μm, and an average particle size of astaxanthin particles in the microcapsules was 0.109 μm. No dichloromethane residue was detected in the product.

Embodiment 5

Astaxanthin crystals, tea polyphenol, and chloroform were mixed in a mass ratio of 1:0.7:500, and heated to 40 degrees centigrade to prepare 0.2% of an astaxanthin solution. The astaxanthin solution entered a dispersing device through an atomization port at a flow rate of 30 kg/hour. Meanwhile, carnauba wax was heated up to 100 degrees centigrade with a heating device together with a circulating material at a flow rate of 0.26 kg/hour, and then introduced into the dispersion device through a spray port to come into contact and mix with the atomized astaxanthin solution. The dichloromethane was rapidly vaporized, and resulting substances entered a container communicated with the dispersing device. A pressure in the container being kept negative, the vaporized dichloromethane was continuously discharged via a vacuum port, and cooled with a heat exchanger, and then recycled and stored into a storage tank. As such, the dichloromethane could be recycled. A dispersion circulating liquid of astaxanthin, tocopherol, solvent, and carnauba wax was obtained in the container, and then circulated into the dispersing device from the spray port through a conveying device, and contacted and mixed with the astaxanthin solution entered form the atomization port. After the system was stabilized, a dispersion liquid in which a flow rate of the astaxanthin was 0.36 kg/hour and a content of the astaxanthin was 16.6% (by mass) was obtained. In the dispersion system, a residence time of the astaxanthin was 15 h. Thereafter, the dispersion liquid was poured into a transfer kettle. In the dispersion liquid, a content of a residual solvent was 0.21% (by mass), and an average particle size of the astaxanthin was 0.115 μm.

Starch octenyl succinate was dissolved in water to prepare an aqueous solution of starch octenyl succinate in which a content of the starch octenyl succinate was 24% (by mass). The aqueous solution was kept at a temperature of 40 degrees centigrade for use. The dispersion liquid with a content of 18.7% (by mass) of the astaxanthin was sent to the supergravity rotating packed bed beater at a flow rate of 0.36 kg/hour, and the prepared aqueous solution of sodium lignosulfonate was simultaneously sent to the supergravity rotating packed bed beater at a flow rate of 1.5 kg/hour, so as to obtain an emulsion with a flow rate of about 1.86 kg/hour. An average particle size of a dispersed phase in the emulsion was 0.214 μm. The emulsion was continuously fed into a spray granulator for granulation, and dried in a fluidized bed to obtain microcapsules with a content of 6.8% (by mass) of astaxanthin. In the microcapsules, an average particle size of a dispersed phase was 0.225 μm, and an average particle size of astaxanthin particles was 0.120 μm. No dichloromethane residue was detected in the product.

Comparative Embodiment 1

5 kg of astaxanthin crystals and 2.5 kg of tocopherol were dissolved in 400 kg of dichloromethane to prepare an astaxanthin solution. 20 kg of gelatin and 10 kg of maltodextrin were dissolved in 80 kg of water, and cooled to a temperature of 40 degrees centigrade. Then, the astaxanthin solution was slowly added dropwise to an aqueous phase of the substance obtained by dissolving 10 kg of the maltodextrin in 80 kg of the water, and then sheared, emulsified and desolventized while being added dropwise. After the dropwise addition was completed, a residual solvent was removed. Then, resulting substances was granulated in a spray granulator, and dried in a fluidized bed to obtain microcapsules with a content of 11.0% (by mass) of astaxanthin. In the microcapsules, an average particle size of the astaxanthin was 0.263 μm, and a content of a solvent residue of the product was 43 ppm.

Comparative Embodiment 2

5 kg of astaxanthin crystals and 2 kg of ascorbyl palmitate were dissolved in 400 kg of acetone to prepare an astaxanthin solution. 25 kg of sodium starch octenyl succinate and 15 kg of dextrin were dissolved in 120 kg of water, with a temperature being kept at 65 degrees centigrade. Then, the astaxanthin solution was slowly added dropwise to an aqueous phase of the substance obtained by dissolving the sodium starch octenyl succinate and the dextrin in 120 kg of the water, and then sheared, emulsified and desolventized while being added dropwise. After the dropwise addition was completed, a residual solvent was removed. Then, resulting substances was granulated in a spray granulator, and dried in a fluidized bed to obtain microcapsules with a content of 9.1% (by mass) of astaxanthin. In the microcapsules, an average particle size of the astaxanthin was 0.251 µm, and a content of a solvent residue of the product was 39 ppm.

Processing stabilities of the astaxanthin microparticles prepared in Embodiment 1, Embodiment 2, Embodiment 3, Embodiment 4, Embodiment 5, Comparative Embodiment 1, and Comparative Embodiment 2 were compared. The astaxanthin particles were mixed with other feed raw materials, conditioned, puffed, granulated, and dried. Retention rate of the astaxanthin in the feed after drying was determined. The results were shown in Table 1 below.

TABLE 1

Retention rate of processing of different astaxanthin microcapsule feed

| Embodiment | Theoretical dosage of astaxanthin (ppm) | Content of astaxanthin after drying (ppm) | Processing stability (%) |
|---|---|---|---|
| Embodiment 1 | 115 | 111 | 96.5 |
| Embodiment 2 | 116 | 111 | 95.7 |
| Embodiment 3 | 117 | 113 | 96.6 |
| Embodiment 4 | 115 | 112 | 97.4 |
| Embodiment 5 | 116 | 112 | 96.6 |
| Comparative Embodiment 1 | 116 | 106 | 91.4 |
| Comparative Embodiment 2 | 117 | 103 | 88.0 |

The astaxanthin microparticles prepared in Embodiment 1, Embodiment 2, Embodiment 4, and Comparative Embodiment 1 were added to commercial feed, and processed into feed A, feed B, feed C, feed D respectively by puffing. Measured contents of astaxanthin in feed A, feed B, feed C, and feed D were 50 ppm, 49 ppm, 51 ppm, and 50 ppm, respectively. Feed A, feed B, feed C, and feed D were configured to feed rainbow trout for 8 weeks, respectively. Coloring effects on muscle of these rainbow trout were compared, and the results were shown in Table 2 below.

TABLE 2

Coloring effects of different astaxanthin feed on muscle of rainbow trout for 8 weeks

| Group | Value of SalmoFan colour atla | Muscle redness (a*) | Content of astaxanthin (mg/kg) |
|---|---|---|---|
| A | 28.57 ± 1.93 | 16.55 ± 1.63 | 1.69 ± 0.60 |
| B | 28.98 ± 1.93 | 17.86 ± 1.46 | 1.82 ± 0.31 |
| C | 29.31 ± 1.54 | 18.17 ± 1.33 | 1.87 ± 0.42 |
| D | 26.16 ± 1.46 | 11.47 ± 1.45 | 1.15 ± 0.36 |

Embodiment 6

1.25 kg of cantharidin crystals, 0.25 kg of ethoxyquin, and 500 kg of chloroform were mixed, and heated to 65 degrees centigrade, to prepare 0.25% of a cantharidin solution. 12.5 kg of hydrogenated palm oil was heated to 100 degrees centigrade with a heating device, and then introduced into a dispersing device through a spray port. The cantharidin solution entered the dispersing device through an atomization port, and contacted and mixed with the hydrogenated palm oil in a spray state, meanwhile, the dichloromethane was rapidly vaporized, and resulting substances entered a container communicated with the dispersing device. A pressure in the container being kept negative, the vaporized dichloromethane was discharged through a vacuum port, and cooled with a heat exchanger, and then recycled and stored into a storage tank. As such, the dichloromethane could be recycled. A mixed dispersion circulating liquid of cantharidin, ethoxyquin, solvent, and hydrogenated palm oil was obtained in the container, and circulated into the dispersing device from the spray port through a conveying device, and contacted with the cantharidin solution entered from the atomization port. This process was repeated until the cantharidin solution was completely delivered. Finally, 14 kg of a dispersion liquid of cantharidin, ethoxyquin, solvent, and hydrogenated palm oil was obtained. In the dispersion liquid, a content of the cantharidin was 8.9% (by mass), a content of a residual solvent was 0.23% (by mass), and an average particle size of the cantharidin was 0.131 µm.

37.5 kg of sodium lignosulfonate was dissolved in 62.5 kg of water, with a temperature being kept at 65 degrees centigrade. The above dispersion liquid was mixed with the aqueous solution of sodium lignosulfonate, and emulsified at high shear speed for 30 min to obtain an emulsion. An average particle size of a dispersed phase of the emulsion was 0.355 µm. The emulsion was desolventized in vacuum for 1 hour, then granulated in a spray granulator, and dried in a fluidized bed to obtain microcapsules with a content of 2.0% (by mass) of cantharidin. An average particle size of a dispersed phase of the microcapsules was 0.362 µm, and an average particle size of the cantharidin particles in the microcapsules was 0.133 µm. No dichloromethane residue was detected in the product.

Embodiment 7

Lycopene crystals, tocopherol, and dichloromethane were mixed in a mass ratio of 1:0.2:800, and heated to 40 degrees centigrade to prepare 0.12% of a lycopene solution. The lycopene solution entered a dispersing device through a spray port at a flow rate of 20 kg/hour. Meanwhile, rape oil was heated up to 100 degrees centigrade with a heating device at a flow rate of 0.49 kg/hour together with circulating materials, and then introduced into the dispersing device through a spray port to come into contact and mix with atomized lycopene solution. The dichloromethane was rapidly vaporized, and resulting substances entered a container communicated with the dispersing device. A pressure in the container being kept negative, the vaporized dichloromethane was continuously discharged via a vacuum port, and cooled with a heat exchanger, and then recycled and stored into a storage tank. As such, the dichloromethane could be recycled. A mixed dispersion circulating liquid of lycopene, tocopherol, solvent, and rape oil was obtained in the container, and then circulated into the dispersing device from the spray port through a conveying device, and contacted and mixed with the lycopene solution entered from the atomization port. After the system was stabilized, a dispersion liquid having a flow rate of 0.52 kg/hour and a content of 4.8% (by mass) of the lycopene was obtained. A residence time of the lycopene in the dispersion system was 8 hours. Thereafter, the dispersion liquid was poured into a transfer kettle. A content of a residual solvent in the dispersion liquid was 0.11% (by mass), and an average particle size of the lycopene in the dispersion liquid was 0.107 μm.

Sodium lignosulfonate was dissolved in water to prepare an aqueous solution in which a content of the sodium lignosulfonate was 35% (by mass). The aqueous solution was kept at a temperature of 40 degrees centigrade for use. The dispersion liquid with a content of 4.8% (by mass) of the lycopene was sent to a supergravity rotating packed bed beater at a flow rate of 0.52 kg/hour, and the prepared aqueous solution of sodium lignosulfonate was simultaneously sent to the supergravity rotating packed bed beater at a flow rate of a flow rate of 3.3 kg/hour, so as to obtain an emulsion with a flow rate of about 3.8 kg/hour. An average particle size of a dispersed phase in the emulsion was 0.286 μm. The emulsion was continuously fed into a spray granulator for granulation, and dried in a fluidized bed to obtain microcapsules with a content of 1.2% (by mass) of lycopene. An average particle size of a dispersed phase of the microcapsules was 0.292 μm, and an average particle size of lycopene particles in the microcapsules was 0.111 μm. No dichloromethane residue was detected in the product.

Embodiment 8

β-carotene crystals, ascorbyl palmitate, and dichloromethane were mixed in a mass ratio of 1:0.4:1600, and heated to 40 degrees centigrade to prepare 0.06% of a β-carotene solution. The β-carotene solution then entered a dispersing device through an atomization port at a flow rate of 25 kg/hour. Meanwhile, palm oil was heated up to 100 degrees centigrade with a heating device at the flow rate of 0.59 kg/hour together with circulating materials, and then introduced into the dispersing device through a spray port to come into contact and mix with atomized β-carotene solution. The dichloromethane was rapidly vaporized, and resulting substances entered a container communicated with the dispersing device. A pressure in the container being kept negative, the vaporized dichloromethane was continuously discharged through a vacuum port, and cooled with a heat exchanger, and then recycled and stored into a storage tank. As such, the dichloromethane could be recycled. The mixed dispersion circulating liquid of β-carotene, tocopherol, solvent, and the palm oil was obtained in the container, and then circulated into the dispersing device from the spray port through a conveying device, and contacted and mixed with the β-carotene solution entered from an atomization port. After the system was stabilized, a dispersion liquid having a flow rate of 0.65 kg/hour and a content of 2.4% (by mass) of the β-carotene was obtained. A residence time of the β-carotene in the dispersion system was 7 hours. Thereafter, the dispersion liquid was poured into a transfer kettle. A content of a residual solvent in the dispersion liquid was 0.12%, and an average particle size of the β-carotene in the dispersion liquid was 0.085 μm.

Gelatin was dissolved in water to prepare an aqueous solution in which a content of the gelatin was 21.4% (by mass). The aqueous solution was kept at a temperature of 40 degrees centigrade for use. The dispersion liquid with a content of 2.4% (by mass) of the β-carotene was sent to a supergravity rotating packed bed beater at a flow rate of 0.65 kg/hour, and the prepared aqueous solution of gelatin was simultaneously sent to the supergravity rotating packed bed beater at a flow rate of 3.65 kg/hour, so as to obtain an emulsion with a flow rate of about 4.3 kg/hour. An average particle size of a dispersed phase of the emulsion was 0.332 μm. The emulsion was continuously fed into a spray granulator for granulation, and dried in a fluidized bed to obtain microcapsules with a content of 1.0% of β-carotene. An average particle size of a dispersed phase of the microcapsules was 0.343 μm, and an average particle size of carotene particles in the microcapsules was 0.089 μm. No dichloromethane residue was detected in the product.

The technical features of the above-described embodiments may be combined in any combination. For the sake of brevity of description, possible combinations of the technical features in the above embodiments are not all described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by one of ordinary skill in the art without departing from the spirit and scope of the disclosure. Therefore, the scope of the disclosure should be determined by the appended claims.

We claim:

1. A method for preparing a carotenoid microcapsule comprising:
   a) mixing carotenoid crystals with an organic solvent, and dissolving the carotenoid crystals in the organic solvent to obtain a carotenoid solution;
   b) introducing the carotenoid solution and a hot grease into a dispersion system to fully disperse the carotenoid into the hot grease, and vaporizing the organic solvent to obtain a carotenoid-containing dispersion liquid;
   c) mixing the carotenoid-containing dispersion liquid with an aqueous solution of a protective colloid to obtain a mixture, and emulsifying the mixture to obtain an emulsion; and
   d) spraying and granulating the emulsion, and drying to obtain the carotenoid microcapsule,
   wherein the dispersion system in step b) comprises a dispersing device, a container connected to the dispersing device, a conveying device, and a heating device,
   the dispersing device is configured for mixing the carotenoid solution obtained in step a) with the hot grease or a circulating material to fully disperse the carotenoid into the hot grease;
   the conveying device is configured for conveying substances in the dispersion system; and
   the heating device is configured for heating a grease or the circulating material to obtain a liquid hot grease or a liquid circulating material,
   the dispersing device comprises a contact portion, a constriction portion, and an expansion portion connected and communicated with each other in sequence, the contact portion is provided with a spray port and an atomization port, the spray port is configured to introduce the liquid hot grease or the liquid circulating material into the contact portion;

the atomization port is configured to transform the carotenoid solution obtained in step a) into tiny carotenoid droplets, so that the carotenoid droplets are capable of being mixed with the liquid hot grease or the liquid circulating material in the contact portion, an organic solvent in the carotenoid droplets is capable of being vaporized, thereby forming carotenoid particles which are dispersed in the hot grease; and the constriction portion is configured to mix the carotenoid droplets formed in the contact portion with the liquid hot grease and make the organic solvent in the carotenoid droplets vaporized, such that a resulting material is introduced into the expansion portion, and then introduced into the container communicated with the dispersing device.

2. The method of claim 1, wherein the container connected with the dispersing device further comprises a vacuum port configured for discharging the vaporized organic solvent from the container.

3. The method of claim 1, wherein the dispersion system is a continuous operation system or a batch operation system.

4. The method of claim 1, wherein a residence time of the substances in the dispersion system is less than or equal to 20 hours.

5. The method of claim 1, wherein a temperature of the hot grease is in a range of 60 degrees centigrade to 100 degrees centigrade.

6. The method of claim 1, wherein in step b), vaporizing and removing a part of the organic solvent in the carotenoid solution, wherein a content of a first residual organic solvent in the carotenoid-containing dispersion liquid is less than 1%.

7. The method of claim 1, wherein step c) further comprises a step of removing a second residual organic solvent in the emulsion after emulsifying the mixture.

8. The method of claim 1, wherein in step b), the carotenoid-containing dispersion liquid comprises the carotenoid particles and dissolved carotenoids, and wherein an average particle size of the carotenoid particles in the carotenoid-containing dispersion liquid is in a range of 0.05 µm to 0.2 µm.

9. The method of claim 1, wherein in step b), a mass ratio of the hot grease and the carotenoid crystals is in a range of 0.7:1 to 20:1.

10. The method of claim 1, wherein in step c), the emulsifying the mixture is processed by a method which is one or more selected from a group consisting of a high pressure homogeneous emulsification, an in-line pipeline high shear emulsification, a supergravity emulsification, a static mixing, and any combination thereof.

11. The method of claim 1, wherein the protective colloid is starch octenyl succinate.

12. The method of claim 1, wherein after the emulsifying the mixture in step c), the carotenoid-containing dispersion liquid is dispersed in the protective colloid to form a dispersed phase, an average particle size of the dispersed phase is in a range of less than 0.7 µm, the dispersed phase comprises at least one kind of carotenoid particle and at least one kind of grease, and the carotenoid particle is nanometer-sized, dispersed in and encapsulated by the grease.

13. The method of claim 1, wherein the organic solvent of step a) is dichloromethane.

14. The method of claim 1, wherein a mass ratio of the organic solvent to the carotenoid crystals in step a) is in a range of 100:1 to 2000:1.

15. The method of claim 1, wherein in step a), further adding antioxidants to the carotenoid solution, wherein the antioxidant is tocopherol; and/or a mass ratio of the antioxidants to the carotenoid crystals is in a range of 0.1:1 to 3:1.

16. The method of claim 1, wherein the hot grease in step b) is physiologically acceptable grease, and the physiologically acceptable grease is selected from one or more selected from a group consisting of wax, vegetable oil, and hydrogenated vegetable oil, wherein the wax is beeswax; and/or the vegetable oil is soybean oil; and/or the hydrogenated vegetable oil is hydrogenated palm oil.

17. The method of claim 1, wherein the carotenoid crystals of step a) is astaxanthin.

* * * * *